(12) United States Patent
Kim et al.

(10) Patent No.: US 7,830,469 B2
(45) Date of Patent: Nov. 9, 2010

(54) BACKLIGHT UNIT AND DISPLAY DEVICE HAVING THE SAME

(75) Inventors: Gi Bin Kim, Gyeonggi-do (KR); Hak Mo Hwang, Gyeonggi-do (KR)

(73) Assignee: LG. Display Co., Ltd., Seoul (KR)

( * ) Notice: Subject to any disclaimer, the term of this patent is extended or adjusted under 35 U.S.C. 154(b) by 442 days.

(21) Appl. No.: 11/821,163

(22) Filed: Jun. 22, 2007

(65) Prior Publication Data

US 2008/0158468 A1 Jul. 3, 2008

(30) Foreign Application Priority Data

Dec. 29, 2006 (KR) ...................... 10-2006-0137612

(51) Int. Cl.
*G02F 1/1333* (2006.01)
(52) U.S. Cl. ........................................................ 349/58
(58) Field of Classification Search .................. 349/58, 349/60
See application file for complete search history.

(56) References Cited

U.S. PATENT DOCUMENTS

| | | | |
|---|---|---|---|
| 4,408,836 A | | 10/1983 | Kikuno |
| 5,739,887 A | * | 4/1998 | Ueda et al. .................. 349/149 |
| 5,838,400 A | * | 11/1998 | Ueda et al. .................... 349/58 |
| 6,373,544 B1 | * | 4/2002 | Hirabayashi ................. 349/149 |
| 6,577,371 B2 | * | 6/2003 | Hirabayashi ................. 349/149 |
| 6,750,926 B2 | * | 6/2004 | Ohgiichi et al. ............... 349/40 |
| 6,927,908 B2 | * | 8/2005 | Stark .......................... 359/449 |
| 6,970,210 B2 | * | 11/2005 | Kim et al. ..................... 349/58 |
| 7,248,308 B2 | * | 7/2007 | Mizutani et al. .............. 349/67 |
| 7,339,637 B2 | * | 3/2008 | Chen et al. .................... 349/65 |
| 7,592,971 B2 | * | 9/2009 | Chang et al. ................. 345/1.3 |
| 2003/0117545 A1 | * | 6/2003 | Coker et al. ................... 349/61 |
| 2004/0051944 A1 | * | 3/2004 | Stark .......................... 359/448 |
| 2004/0145688 A1 | * | 7/2004 | Mizutani et al. ............ 349/113 |
| 2005/0157516 A1 | * | 7/2005 | Chen et al. ................... 362/555 |
| 2006/0007054 A1 | * | 1/2006 | Chang et al. ................. 345/1.3 |
| 2006/0007369 A1 | * | 1/2006 | Jin et al. ....................... 349/58 |
| 2006/0077544 A1 | * | 4/2006 | Stark .......................... 359/448 |
| 2006/0209012 A1 | * | 9/2006 | Hagood, IV ................ 345/109 |
| 2008/0150853 A1 | * | 6/2008 | Peng et al. .................... 345/87 |

OTHER PUBLICATIONS

Office Action issued in corresponding Chinese Patent Application No. 2007101260152; issued Aug. 14, 2009.

* cited by examiner

*Primary Examiner*—K. Cyrus Kianni
(74) *Attorney, Agent, or Firm*—Brinks Hofer Gilson & Lione

(57) ABSTRACT

A tiled display device includes a combination of multiple display devices to form a larger tiled display device. The larger tiled display device minimizes the boundaries between in the multiple display devices to improve the active area of the display. A partition wall between display devices may be configured to reduce the distance between the combined display devices.

7 Claims, 15 Drawing Sheets

<Related Art>

<Related Art>

BACKLIGHT UNIT AND DISPLAY DEVICE HAVING THE SAME

This application claims the benefit of Korean Patent Application No. 0137612/2006, filed on Dec. 29, 2006, which is hereby incorporated by reference in its entirety.

BACKGROUND

1. Field of the Disclosure

The present disclosure relates to a backlight unit, which can improve the image quality of a display device. In particular, the assembly characteristics of a large display device with a plurality of display panels may be improved.

2. Description of the Related Art

With rapid development of display devices, slim and light display devices with improved performance have been preferred. Cathode ray tubes (CRTs) have advantages in performance and price but disadvantages based on their size, weight, and portability.

Liquid crystal display devices (LCDs) are considered as replacement for CRTs because LCDs are slimmer and light weight and have lower power consumption. LCDs are used as display devices in information processing devices, such as home computers. In LCDs, a specific molecular arrangement of liquid crystals is changed when a predetermined voltage is applied thereto. Light transmittance can be adjusted using the change in the molecular arrangement of the liquid crystals. In this way, the LCD displays an image.

Although LCDs have been widely used in notebook computers and household television sets, their applications are expanding to larger public display devices. LCDs may be used for large billboards for a variety purposes, such as a stadium scoreboard or "jumbotron." As a result, the LCDs must be large in size so that a number of people can view a clear image from a large distance. In LCDs, it may be difficult to make a large glass substrate, and failure may occur in the liquid crystals. In addition, the fabrication of the large display device requires larger processing equipment, leading to the increase in a manufacturing cost of the display device. Since signal lines of the LCD become longer, pixels become more difficult to drive and image quality may be degraded.

A tiling LCD has been developed which may meet a demand for a new display device and be manufactured at a low cost. A tiling LCD may be a plurality of smaller LCDs that are combined side-by-side into a larger LCD. The smaller LCDs may be referred to as tiles that are combined to form the tiling LCD. FIG. 1 is a perspective view of a related art LCD, and FIG. 2 is a cross-sectional view taken along line I-I' of FIG. 1. Specifically, FIG. 2 is a cross-sectional view of edge portions of liquid crystal display modules.

As shown in FIG. 1, a related art large LCD can be manufactured by sequentially arranging first to fourth liquid crystal display modules 10, 20, 30 and 40. As shown in FIG. 2, the related art liquid crystal display modules include liquid crystal panels 11 and 21 displaying an image, backlight units 15 and 25 supplying light to the liquid crystal panels 11 and 21, bottom cases 17 and 27 receiving the backlight units 15 and 25, and top cases 19 and 29 attached to the bottom cases 17 and 27 to fix the liquid crystal panels 11 and 21, respectively. The backlight units 15 and 25 include light sources 16 and 26, respectively. The backlight units 15 and 25 further include guide panels 31 and 32 receiving the liquid crystal panels 11 and 21 and various optical films 13 and 23, respectively.

The LCD 50 has an active area (AA) where an image is displayed and a non-active area NA where no image is displayed. The non-active area NA is outside of the active area AA for each display module. The non-active area NA between LCD modules is defined as the width k. As shown in FIG. 2, the non-active area between module 40 and module 30 is the width k. Likewise, the width between modules 10 and 20, 10 and 40, and 20 and 30 are all width k. The non-active area NA at the outer edge portions of the liquid crystal display modules 10, 20, 30 and 40 is approximately half of width k.

Therefore, a non-active area NA with a large width k exists between the first to fourth liquid crystal display modules 10, 20, 30 and 40. The wide non-active area NA is an obstacle to maximizing the image quality of the display. The non-active areas may affect the continuity of an image shown on a tiled LCD display device.

BRIEF SUMMARY

In a first aspect, a display device includes at least two display panels and a guide panel configured to receive the display panels. The guide panel includes a frame disposed along a periphery of the display panels and a partition wall within the frame. The partition wall is configured to receive at least an end portion of the display panels. A backlight unit is configured to provide light to the display panels.

In a second aspect, a display device includes at least two display panels and at least two backlight units. Each of the display panels corresponds with one of the backlight units. Each of the display panels is configured to receive light from the respective one of the backlight units. A guide panel is configured to receive the display panels, the guide panel comprising a frame disposed along a periphery of the display panels and a partition wall disposed within the frame and extending between the display panels.

In a third aspect, a frame assembly is configured to receive a tiled display unit and includes a plurality of display panels and at least one backlight. The frame assembly further includes an outer frame extending along the periphery of the tiled display panels. A partition is housed within the outer frame and extending between the display panels, the partition comprising two opposing sides, wherein each side comprises a mounting portion extending under a respective display panel. At least one bottom case is coupled with the partition and extending under at least one of the display panels, wherein each of the at least one bottom cases is configured to receive the at least one backlight.

It is to be understood that both the foregoing general description and the following detailed description of the present invention are exemplary and explanatory and are intended to provide further explanation of the invention as claimed. Other systems, methods, features and advantages will be, or will become, apparent to one with skill in the art upon examination of the following figures and detailed description. Nothing in this section should be taken as a limitation on those claims. Further aspects and advantages are discussed below in conjunction with the embodiments.

BRIEF DESCRIPTION OF THE DRAWINGS

The system and/or method may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views. The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the embodiments of the present invention, examples of which are illustrated in the accompanying drawings.

A backlight unit and a display device having the same according to various embodiments will be described below in detail with reference to the accompanying drawings. The display device may refer to any display devices which display an image using an external or non-integrated light source. For example the display device may be a liquid crystal display (LCD) device.

The display device includes a plurality of display panels arranged in a row or in a matrix form. The plurality of display panels may be referred to as tiles and the display device with the plurality of panels/tiles may be referred to as a tiling display device. For illustrative purposes, the display device will be described as a liquid crystal display with liquid crystal panels.

Figure 1:
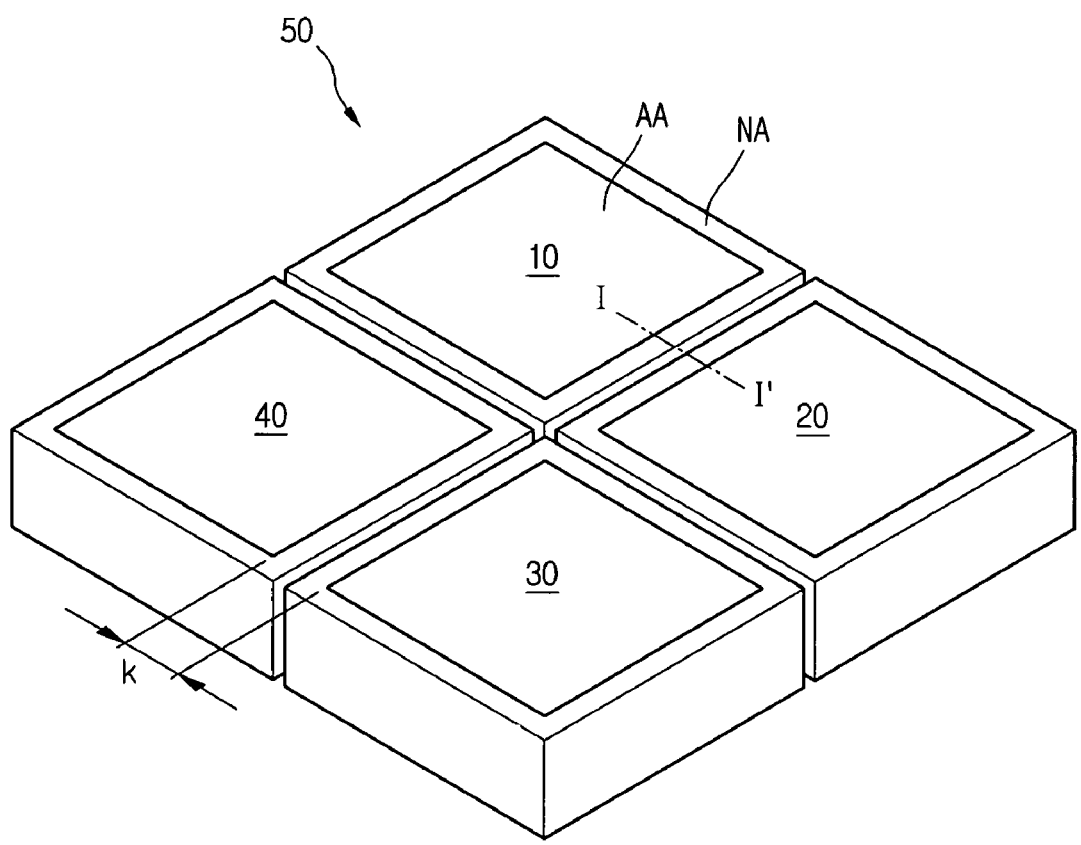
FIG. 1 is a perspective view of a related art display device.
Figure 2:
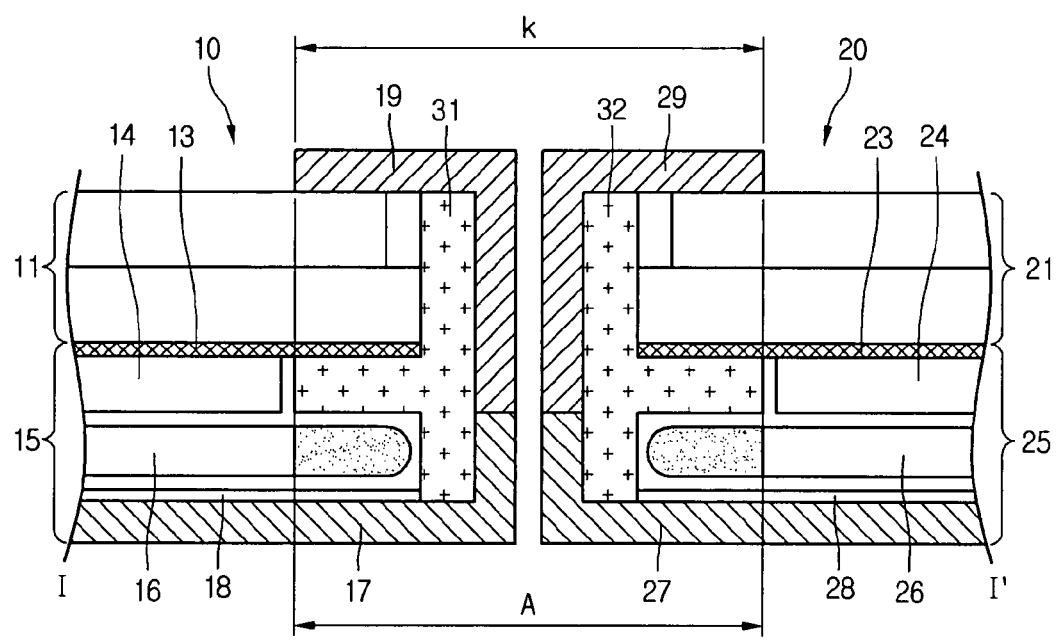
FIG. 2 is a cross-sectional view taken along line I-I' of FIG. 1.
Figure 3:
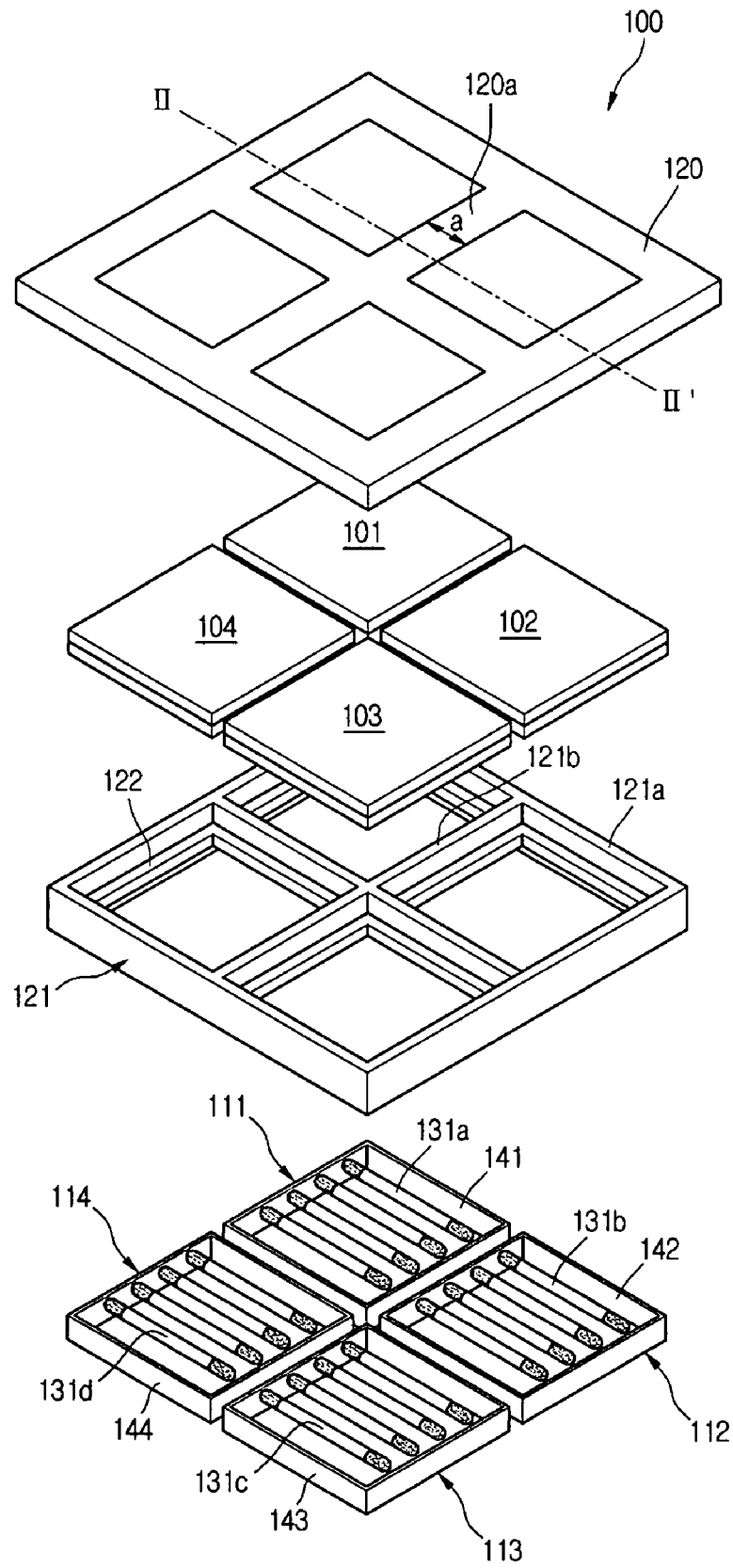
FIG. 3 is an exploded perspective view of a display device according to a first embodiment.
Figure 4:
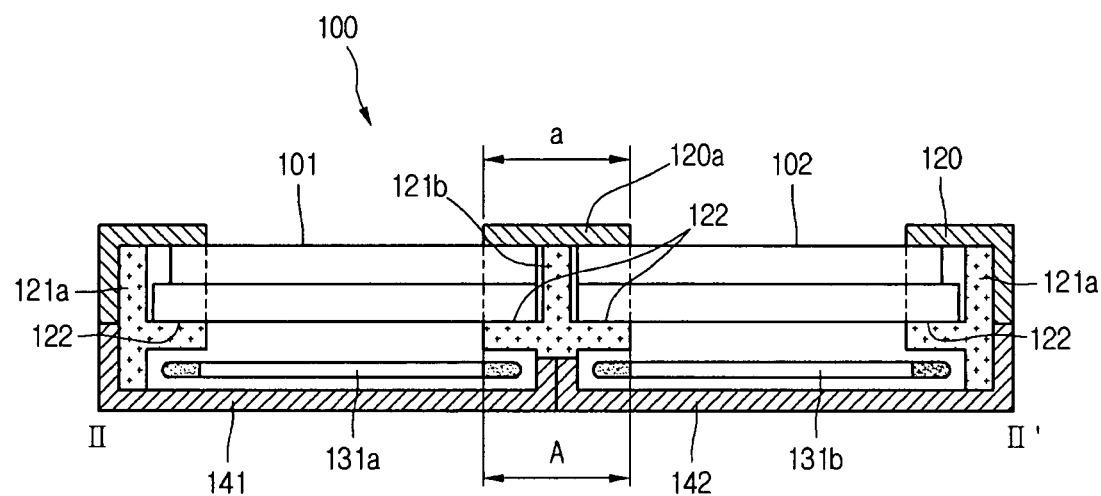
FIG. 4 is a cross-sectional view taken along line II-II' of FIG. 3.

FIG. 3 is an exploded perspective view of an LCD according to a first embodiment, and FIG. 4 is a cross-sectional view taken along line II-II' of FIG. 3. As shown in FIGS. 3 and 4, the liquid crystal panels are arranged in a 2×2 matrix. Referring to both FIGS. 3 and 4, the LCD 100 includes first to fourth liquid crystal panels 101, 102, 103 and 104. First and fourth backlight units 111, 112, 113 and 114 are arranged under or coupled with the first to fourth liquid crystal panels 101, 102, 103 and 104, respectively. Herein, the phrase "coupled with" is defined to mean directly connected to or indirectly connected through one or more intermediate components. The first to fourth backlight units 111, 112, 113 and 114 supply light to the first to fourth liquid crystal panels 101, 102, 103 and 104, respectively.

The first to fourth backlight units 111, 112, 113 and 114 include first to fourth light sources 131a, 131b, 131c and 131d, respectively. Examples of the light sources may include Cold Cathode Fluorescent Lamp (CCFL), External Electrode Fluorescent Lamp (EEFL), Hot Cathode Fluorescent Lamp (HCFL), Flat Fluorescent Lamp (FFL), and Light Emitting Diode (LED). The first to fourth light sources 131a, 131b, 131c and 131d are received in and coupled with bottom cases 141, 142, 143 and 144, respectively.

The first to fourth light sources 131a, 131b, 131c and 131d may be arranged on and coupled with the bottom surfaces of the first to fourth bottom cases 141, 142, 143 and 144 at predetermined intervals, respectively. In other words, the backlight units may be direct-type backlight units. Alternatively, the first to fourth light sources 131a, 131b, 131c and 131d may be arranged on lateral surfaces of the first to fourth bottom cases 141, 142, 143 and 144. In other words, the backlight units may be edge-type backlight units.

A guide panel 121 serving as a receiving member is provided between the first to fourth backlight units 111, 112, 113 and 114 and the liquid crystal panels 101, 102, 103 and 104. The guide panel 121 is integrally formed to receive the first to fourth liquid crystal panels 101, 102, 103 and 104. The guide panel 121 may couple the backlight units 111-114 with the liquid crystal panels 101-104, respectively. The guide panel 121 may also provide support for both the backlight units 111-114 and the liquid crystal panels 101-104.

In one embodiment, the guide panel 121 includes a main frame 121a and a partition wall 121b. The main frame 121a is formed along the periphery of the LCD 100, and the partition wall 121b is branched from the main frame 121a and formed along boundaries of the liquid crystal panels 101, 102, 103 and 104. Accordingly, the guide panel 121 has four partitioned regions that respectively receive the first to fourth liquid crystal panels 101, 102, 103 and 104. In alternate embodiments, the partition wall 121b may partition more or fewer regions. For example, the partition wall 121b may partition two regions or may partition dozens of regions.

The guide panel 121 may further include a mounting portion 122 configured to maintain a stable arrangement of the first to fourth liquid crystal panels 101, 102, 103 and 104. The mounting portion 122 of the guide panel 121 protrudes from the main frame 121a and the partition wall 121b toward the inside of the partitioned regions of the guide panel 121, such that the first to fourth liquid crystal panels 101, 102, 103 and 104 can be stably received in or coupled with the guide panel 121.

A top case 120 is disposed above or coupled with the first to fourth liquid crystal panels 101, 102, 103 and 104. The top case 120 covers the first to fourth liquid crystal panels 101, 102, 103 and 104 and is coupled with the bottom cases 141, 142, 143 and 144. The top case 120 is integrally formed corresponding to the first to fourth liquid crystal panels 101, 102, 103 and 104.

The top case 120 is formed to cover non-active areas NA of the first to fourth liquid crystal panels 101, 102, 103 and 104.

In particular, the top case 120 further includes a shielding member 120a covering the non-active areas NA at the attached boundaries of the first to fourth liquid crystal panels 101, 102, 103 and 104. The first liquid crystal panel 101 and the second liquid crystal panel 102 are received in or coupled with the guide panel 121. A width "a" of the shielding member 120a covering the non-active area NA along the partition wall 121b represents the non-active area, which reduces the area of display. Accordingly, the reduction in the width "a" results in improved display quality.

The reduction in the width "a" of the non-active area NA leads to the reduction in the area of the non-display region of the LCD. Accordingly, a tiling display device including at least two display panels attached to each other can improve image quality by reducing the area of the non-display region.

In addition, the backlight unit is modularized in such a way that the light sources are received in or coupled with the bottom cases. A large backlight unit can be manufactured by attaching a plurality of modularized backlight units to one another. The modularized backlight unit can be easily mass-produced. Further, the backlight unit can be manufactured in various sizes by attaching the modularized backlight units, regardless of the size of the liquid crystal panel. Further, when a failure occurs in the large backlight unit, only the defective backlight unit has to be replaced.

Figure 5:
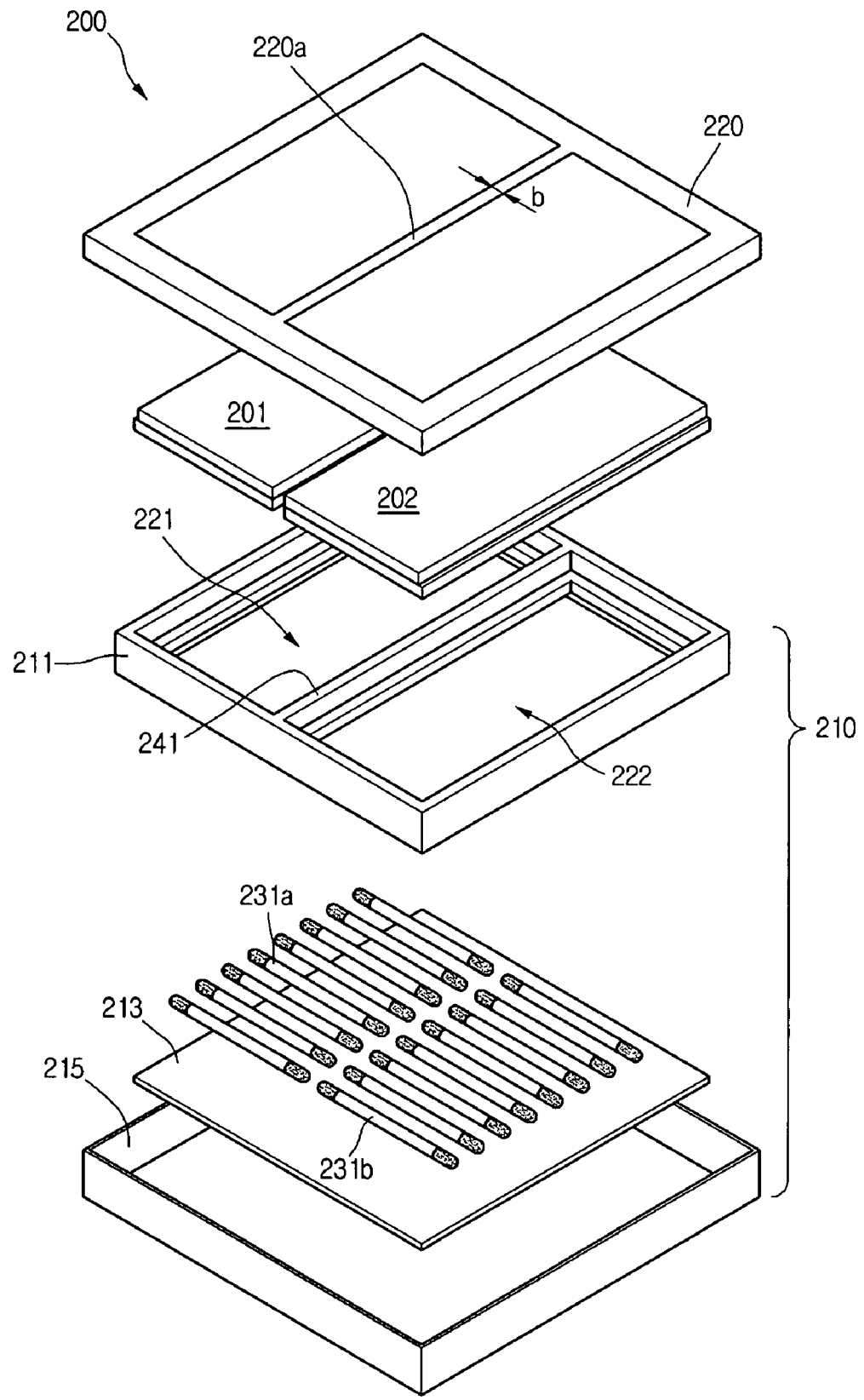
FIG. 5 is an exploded perspective view of a display device according to a second embodiment.
Figure 6:
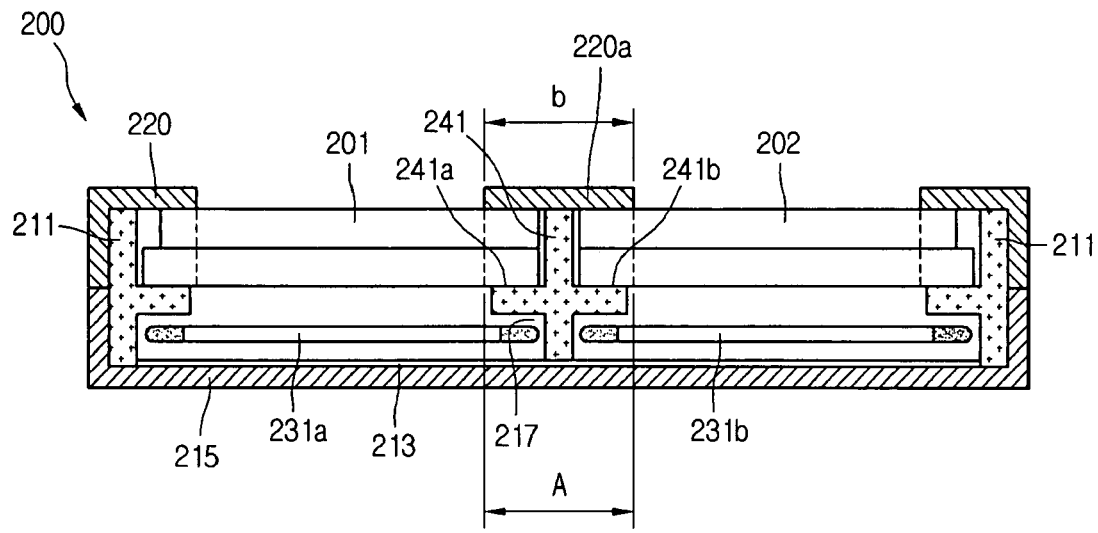
FIG. 6 is a cross-sectional view of the display device illustrated in FIG. 5.

FIG. 5 is an exploded perspective view of a display device according to a second embodiment, and FIG. 6 is a cross-sectional view of the display device illustrated in FIG. 5. Although the tiling display device of FIGS. 5 and 6 includes two display panels arranged in parallel, the number of the display panels can be more than two. Two display panels are described throughout for convenience.

Referring to FIGS. 5 and 6, the display device 200 includes a first liquid crystal panel 201, a second liquid crystal panel 202, and a single backlight unit 210. The first liquid crystal panel 201 and the second liquid crystal panel 202 are arranged in parallel, and the single backlight unit 210 is arranged under the first liquid crystal panel 201 and the second liquid crystal panel 202.

The display device 200 further includes a bottom case 215 coupled with a top case 220. The bottom case 215 receives the first and second liquid crystal panels 201 and 202 and the backlight unit 210, and the top case 220 is coupled with the bottom case 215 to protect the first and second liquid crystal panels 201 and 202 and the backlight unit 210. The backlight unit 210 has a first light emitting region 221 and a second light emitting region 222. The first light emitting region 221 corresponds with and provides light to the first liquid crystal panel 201, and the second light emitting region 222 corresponds with and provides light to the second liquid crystal panel 202.

Each of the first and second liquid crystal panels 201 and 202 includes a bottom substrate (not shown) and a top substrate (not shown) disposed opposite to each other. The top substrate is coupled with the bottom substrate. Although not shown, the bottom substrate includes a plurality of gate lines, a plurality of data lines, and a plurality of pixels regions defined by the crossing of the gate lines and the data lines. A plurality of thin film transistors (TFTs) connected to the gate lines and the data lines are formed in the pixel regions.

The top substrate includes red, green and blue color filter layers corresponding to the pixel regions. A liquid crystal layer is interposed between the bottom substrate and the top substrate. Electrode structures are formed in the bottom substrate and/or the top substrate. The electrode structures are connected to the TFTs to drive the liquid crystal layer.

The backlight unit 210 includes a plurality of lamps 231a and 231b emitting light, and a reflection plate 213 disposed under the lamps 231a and 231b to reflect the light traveling in the direction of the bottom case 215. The reflection plate 213 may be separately provided in the first and second light emitting regions 221 and 222, or may be integrally formed corresponding to the first and second light emitting regions 221 and 222. Examples of the lamps 231a and 231b may include Cold Cathode Fluorescent Lamp (CCFL), External Electrode Fluorescent Lamp (EEFL), Hot Cathode Fluorescent Lamp (HCFL), Flat Fluorescent Lamp (FFL), and Light Emitting Diode (LED). The backlight unit 210 may further include a bottom cover receiving the lamps 231a and 231b and the reflection plate 213.

The backlight unit 210 further includes a guide panel 211 receiving and supporting the first and second liquid crystal panels 201 and 202. Although not shown, a diffuser plate and optical sheets may be further provided above or adjacent to the lamps 231a and 231b to diffuse and condense the light emitted from the lamps 231a and 231b. The diffuser plate and the optical sheets may be disposed under the first liquid crystal panel 201 and the second liquid crystal panel 202, or may be integrally formed corresponding to the first liquid crystal panel 201 and the second liquid crystal panel 202.

The guide panel 211 further includes a partition wall 241 defining the first light emitting region 221 and the second light emitting region 222. The partition wall 241 includes a first support member 241a and a second support member 241b. The first support member 241a protrudes toward the first light emitting region 221 to support the first liquid crystal panel 201, and the second support member 241b protrudes toward the second light emitting region 222 to support the second liquid crystal panel 202.

The partition wall 241 couples the first light emitting region 221 providing light to the first liquid crystal panel 201 with the second light emitting region 222 providing light to the second liquid crystal panel 202. The partition wall 241 reduces the distance between the panels 201 and 202 by acting as a barrier for both panels 201, 202. In other words, the partition wall 241 is coupled with and receives both panels 201, 202. Since a physical distance between the first liquid crystal panel 201 and the second liquid crystal panel 202 is reduced due to the partition wall 241, the two liquid crystal panels 201 and 202 can be arranged close to each other.

The top case 220 is formed to cover the non-active regions A of the first and second liquid crystal panels 201 and 202, and includes a shielding member 220a covering the non-active area NA corresponding to the attached portion of the first and second liquid crystal panels 201 and 202. As the first liquid crystal panel 201 and the second liquid crystal panel 202 are arranged closer to the guide panel 211, a width "b" of the shielding member 220a covering the non-active area NA is further reduced. In other words, the guide panel 211 including the partition wall 241 reduce the non-active area NA by reducing the distance between panel 201 and panel 202.

In the tiling display device driving at least two display panels attached to each other, the reduction in the width "b" of the non-active area NA leads to the reduction in the non-image display region, thereby improving an entire image quality.

Shock absorbing pads may be further provided between the first support member 241a and the bottom substrate of the first liquid crystal panel 201 and between the second support member 241b and the bottom substrate of the second liquid crystal panel 202. In addition, shock absorbing pads may be provided between the top substrate of the first liquid crystal panel 201 and the top case 220 and between the top substrate of the second liquid crystal panel 202 and the top case 220.

Figure 7:
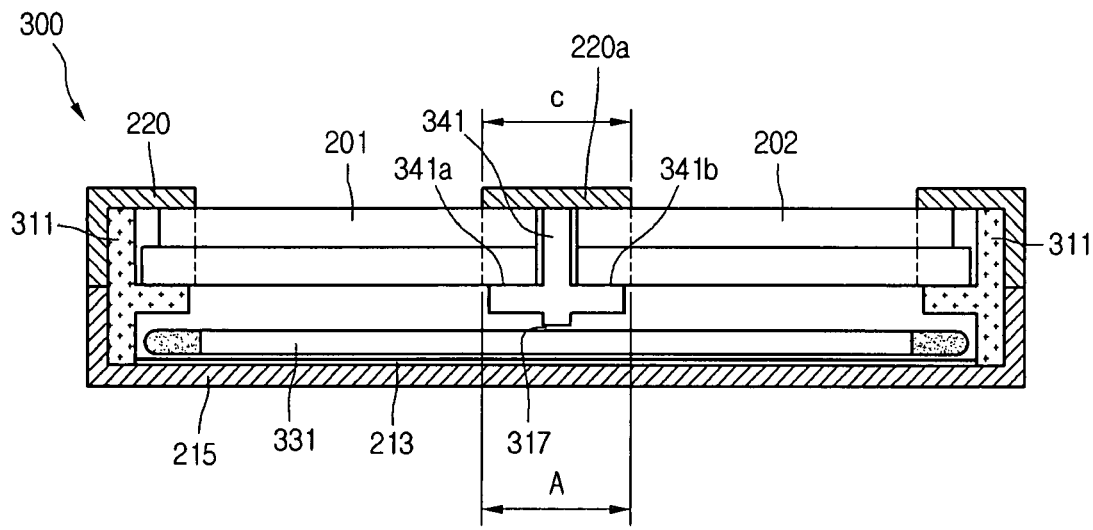
FIG. 7 is a cross-sectional view of a display device according to a third embodiment.

FIG. 7 is a cross-sectional view of a display device according to a third embodiment. A detailed description of parts identical or similar to those of FIG. 6 will be omitted for conciseness.

A lamp 331 of the display device 300 is arranged to cross at least two liquid crystal panels 201 and 202. A guide panel 311 includes a partition wall 341 along the attached boundary of the liquid crystal panels 201 and 202. The guide panel 311 further includes a partition wall 341 defining the first light emitting region 221 and the second light emitting region 222. The partition wall 341 includes a first support member 341a and a second support member 341b. The first support member 341a protrudes toward the first light emitting region 321 to support the first liquid crystal panel 301, and the second support member 341b protrudes toward the second light emitting region 322 to support the second liquid crystal panel 302.

The partition wall 341 has a through portion 317 such that the lamp 331 can be arranged to cross the first and second liquid crystal panels 201 and 202. The through portion 317 may be a hole or an opening in the partition wall 341 that is opened toward the bottom of the bottom case 215. In particular, the through portion 317 may receive the lamp 331, allowing the lamp 331 to extend across the partition wall 341. The through portion 317 may shaped as described with respect to FIGS. 11a-11d discussed below.

Since it is unnecessary to separately provide the lamp to the first and second liquid crystal panels 201 and 202, the number of the lamps of the backlight unit may be reduced. In addition, the number of inverters for supplying power can also be reduced. Therefore, a manufacturing cost of the display device is reduced by extending a lamp 331 across at least two display panels.

In addition, since electrodes which are non-light emitting regions are formed only on the sides of the lamp, the lamp emits light even at the boundary of the first and second display panels. Since a width "c" of the non-active area NA is reduced, the non-image display region is reduced, thereby improving an entire image quality.

Figure 8:
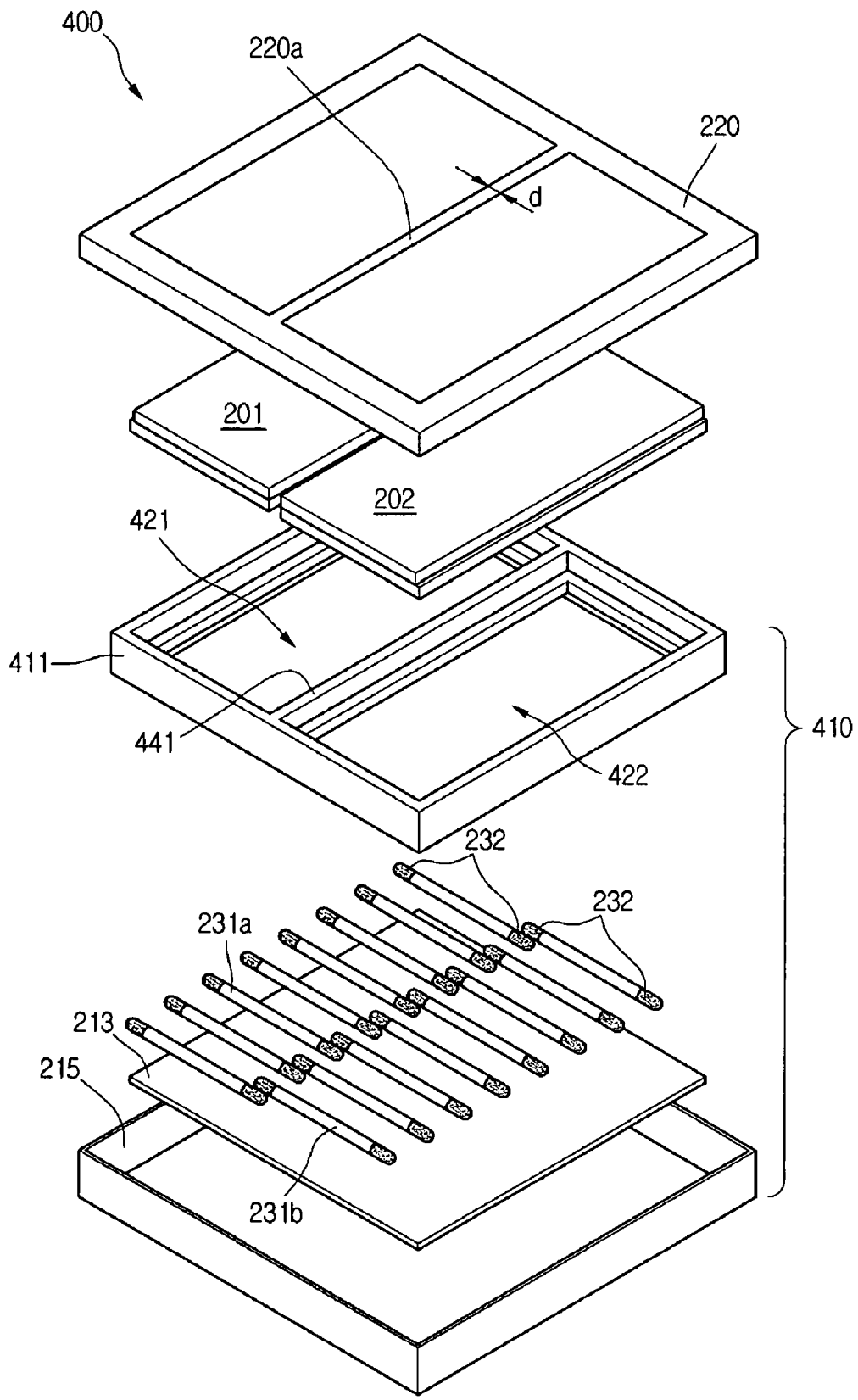
FIG. 8 is an exploded perspective view of a display device according to a fourth embodiment.
Figure 9:
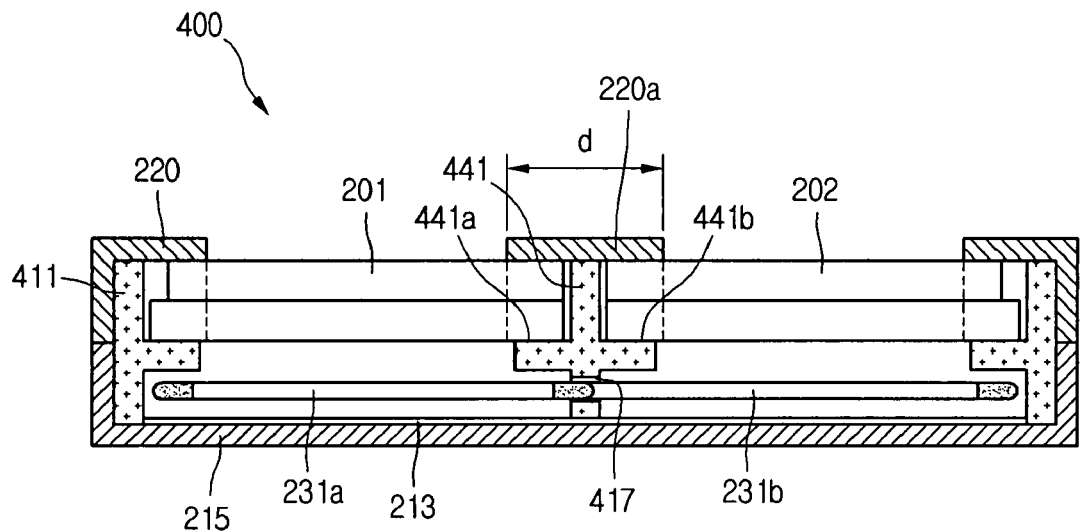
FIG. 9 is a cross-sectional view of the display device illustrated in FIG. 8.

FIG. 8 is an exploded perspective view of a display device according to a fourth embodiment. FIG. 9 is a cross-sectional view of the display device illustrated in FIG. 8. A detailed description about parts identical or similar to those of previous Figures will be omitted for conciseness. A tiling display device 400 of FIGS. 8 and 9 includes two display panels arranged in parallel. As discussed above, the number of the display panels may be more than two.

Referring to FIGS. 8 and 9, the backlight unit 410 includes a first light emitting region 421 and a second light emitting region 422. The backlight unit 410 includes a plurality of lamps 231a and 231b emitting light, and a reflection plate 213 disposed under the lamps 231a and 231b to reflect light traveling toward the bottom case 215.

The backlight unit 410 further includes a guide panel 411 receiving, coupling, and supporting the first lamps 231a disposed in the first light emitting region 421, the second lamps 231b disposed in the second light emitting region 422, and the first and second liquid crystal panels 201 and 202 disposed above the backlight unit 410. The backlight unit 410 may further include a bottom cover coupled with the first and second lamps 231a and 231b and the reflection plate 213. The guide panel 411 further includes a partition wall 441 defining the first light emitting region 421 and the second light emitting region 422.

The partition wall 441 includes a first support member 441a and a second support member 441b. The first support member 441a protrudes toward the first light emitting region 421 to support the first liquid crystal panel 201, and the second support member 441b protrudes toward the second light emitting region 422 to support the second liquid crystal panel 202. The partition wall 441 couples the first liquid crystal panel 201 with the second liquid crystal panel 202.

The partition wall 441 includes through portions 417, which may accept the ends of both the first lamps 231a and the second lamps 231b. In other words, the partition wall 441 receives an end from the first lamps 231a and receives an end from the second lamps 231b. The partition wall 441 may include a plurality of through portions 417. In addition, the first lamps 231a and the second lamps 231b may be arranged to overlap each other in the corresponding through portions 417. Electrodes and circuit boards for supplying power to the lamps are disposed in the through portion 417. A lower portion of the through portion 417 may be opened so as to receive the power.

The through portions 417 provide spaces where the first lamps 231a overlap the second lamps 231b corresponding to the first lamps 231a, thereby expanding the active area. In other words the through portion 417 receives both the first lamp 231a and the second lamp 231b, which are overlapped, such that the electrodes 232 of each of the lamps may be adjacent one another. The through portion 417 may be shaped as described with respect to FIGS. 11a-11d discussed below. Both ends of the first and second lamps 231a and 231b are the electrodes 232 that are non-light emitting regions. The non-light emitting region can be reduced by overlapping the electrodes 232 of the first and second lamps 231a and 231b. In addition, since the electrodes 232 of the first and second lamps 231a and 231b contact each other, a voltage has only to be applied to the contact point of the electrodes 232.

The partition wall 441 is shared by the first light emitting region 421 providing light to the first liquid crystal panel 201 and the second light emitting region 422 providing light to the second liquid crystal panel 202. The partition wall 441 couples the first liquid crystal panel 201 and the second liquid crystal panel 202 to reduce the distance between the two. Because of the partition wall 441, a physical distance between the first liquid crystal panel 201 and the second liquid crystal panel 202 is reduced due to the two liquid crystal panels 201 and 202 being arranged closer to one other.

Due to the close arrangement of the first and second liquid crystal panels 201 and 202, the non-light emitting region of the backlight unit 410 may be exposed. However, the non-light emitting region of the backlight unit 410 is reduced. Therefore, even though a width "d" of the shielding member 220a of the top case 220 is reduced, the non-light emitting region will not be exposed. The tiling display device driving at least two display panels attached to each other may improve the image quality because of the reduction of the non-active area NAnd the width "d" of the non-light emitting region.

Figure 10:
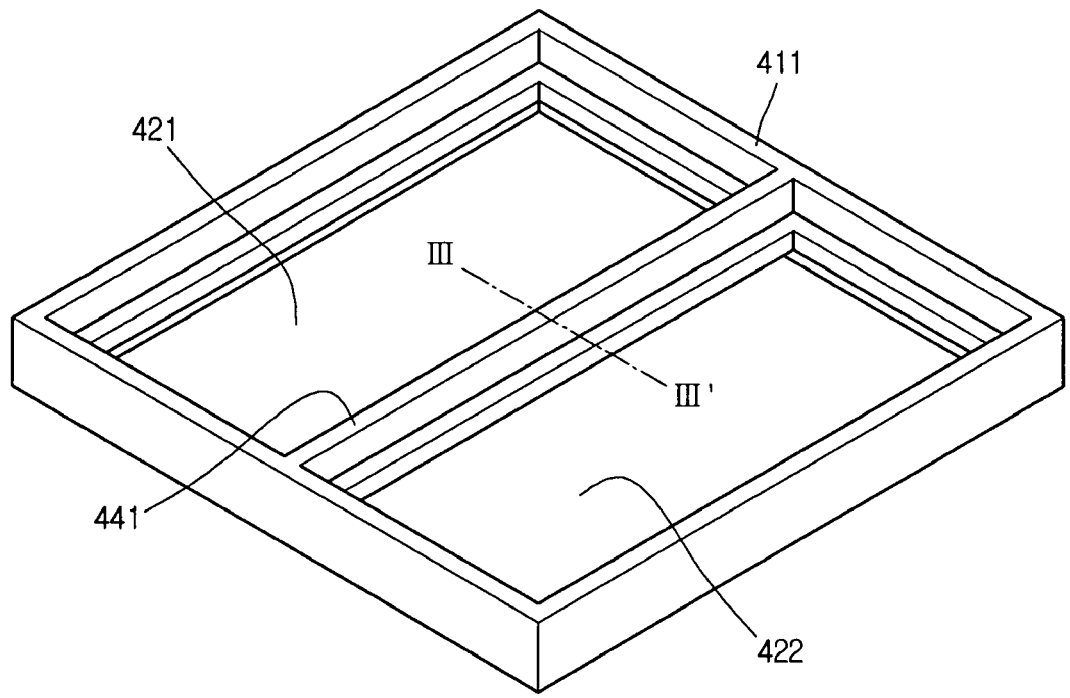
FIG. 10 is a perspective view of a guide panel in a backlight unit according to an embodiment.
Figure 11A:
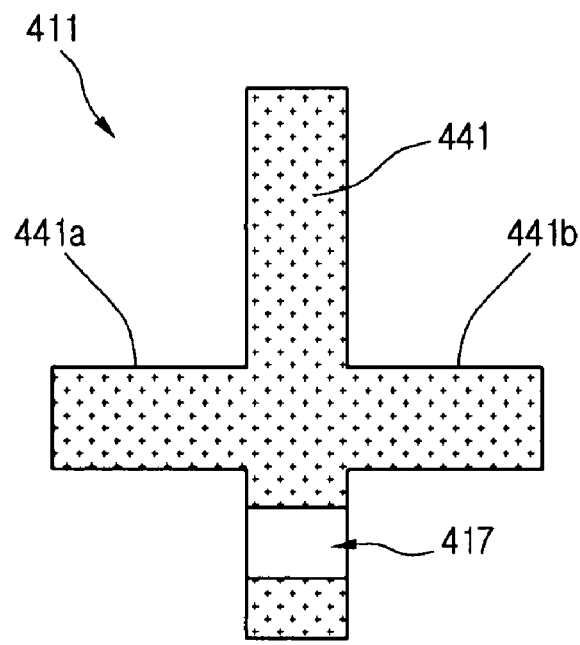
FIG. 11A is a cross-sectional view taken along line III-III' of FIG. 10.
Figure 11B:
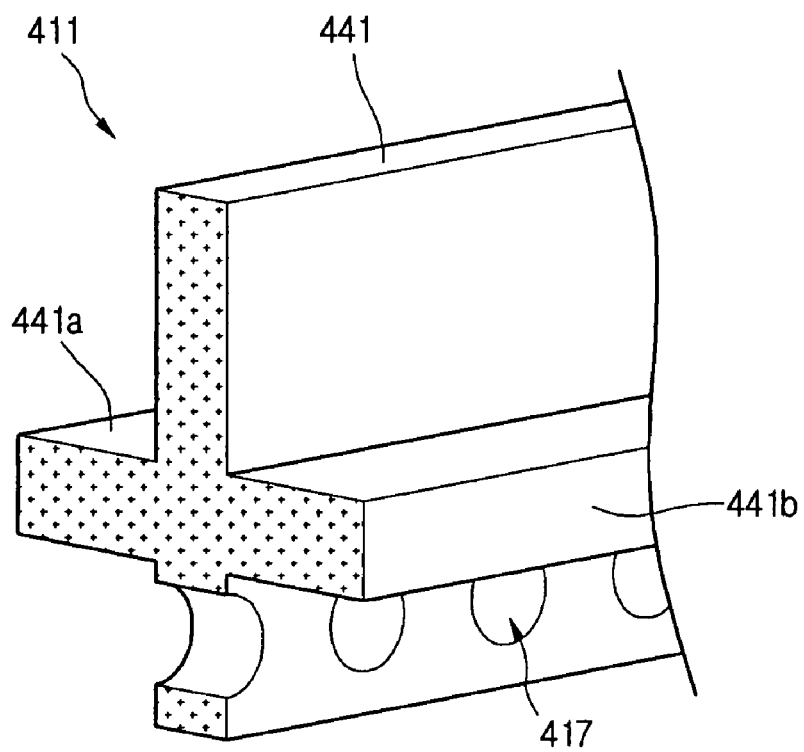
FIG. 11B is a perspective view taken along line III-III' of FIG. 10.
Figure 11C:
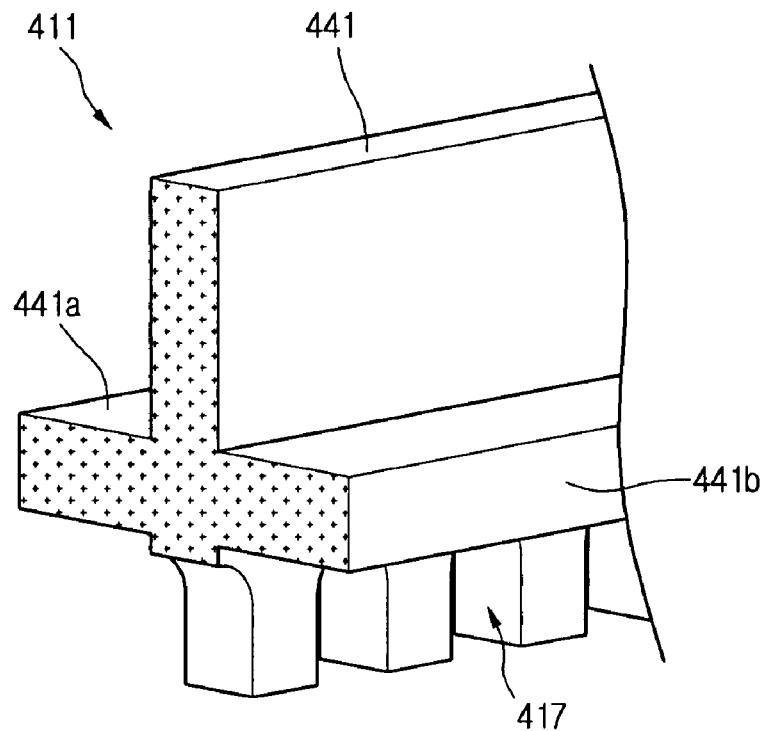
FIGS. 11C and 11D are perspective views of partition walls of a guide panel in a backlight unit of an LCD according to embodiments.
Figure 11D:
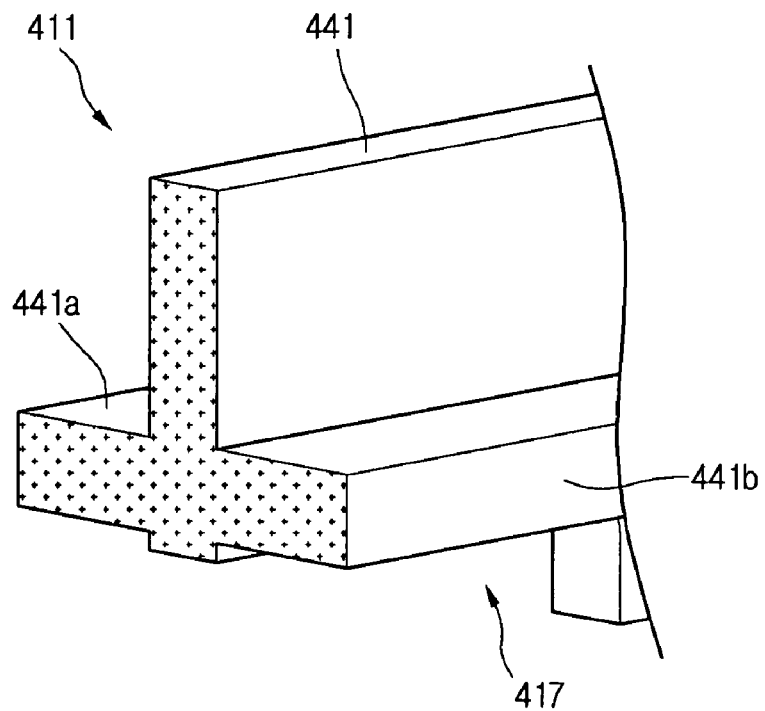

FIG. 10 is a perspective view of a guide panel in a backlight unit of an LCD according to an embodiments of the present disclosure, FIG. 11a is a cross-sectional view taken along line III-III' of FIG. 10, and FIGS. 11b, 11c, and 11d is a perspective view taken along line III-III' of FIG. 10. In particular, FIGS. 11c and 11d are perspective views of partition walls of a guide panel in a backlight unit of an LCD according to embodiments of the present disclosure.

Referring to FIG. 10, the guide panel 411 receives and supports the first liquid crystal panel 201 and the second liquid crystal panel 202. The guide panel 411 further includes a partition wall 441 defining the first light emitting region 421 and the second light emitting region 422.

As in FIG. 11a, the partition wall 441 includes a first support member 441a and a second support member 441b. The first support member 441a protrudes toward the first light emitting region 421 to support the first liquid crystal panel 201, and the second support member 441b protrudes toward the second light emitting region 422 to support the second liquid crystal panel 202.

Referring to FIGS. 11a, 11b, and 11c, the partition wall 441 includes through portions 417 connecting the first lamps 231a to the second lamps 231b. The through portions 417 provide spaces where the first lamps 231a overlap the second lamps 231b corresponding to the first lamps 231a, thereby expanding the active area. Both ends of the first and second lamps 231a and 231b are the electrodes 232 that are non-light emitting regions. At this point, the non-light emitting region can be reduced by overlapping the electrodes 232 of the first and second lamps 231a and 231b. The through portions 417 may be formed corresponding to pairs of the first and second lamps 231a and 231b. Alternatively, one through portion 417 may be formed corresponding to at least one lamp pair.

Alternatively, the through portions 417 may receive a single lamp 331 that extends across the through portion 417. Although the through portions 417 have a circular shape in FIGS. 11a and 11b, they can also have various shapes, e.g., a triangular shape, a rectangular shape, and a polygonal shape.

Referring to FIG. 11d, the partition wall 441 includes the through portions 417 such that the first lamps 231a and the second lamps 231b are coupled in 1:1 correspondence. The through portions 417 are opened toward the bottom case. Electrodes and circuit boards for supplying power to the lamps may be disposed in the opened portions of the through portions 417. The through portions 417 may be formed corresponding to the pairs of the first and second lamps 231a and 231b contacting each other. As illustrated in FIG. 11d, a plurality of lamp pairs may be disposed in a single through portion 417.

Figure 12:
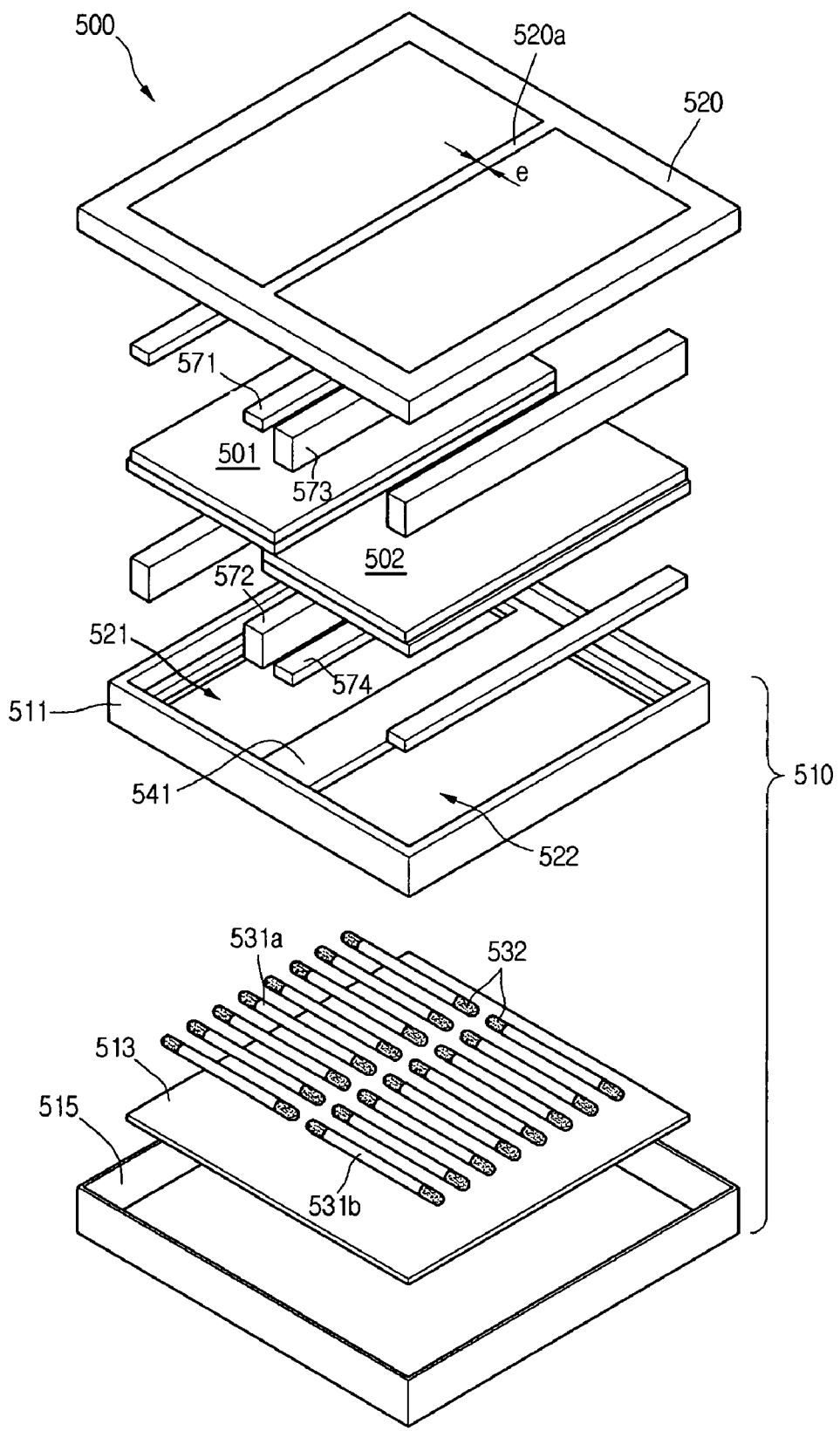
FIG. 12 is an exploded perspective view of a display device according to a fifth embodiment.
Figure 13:
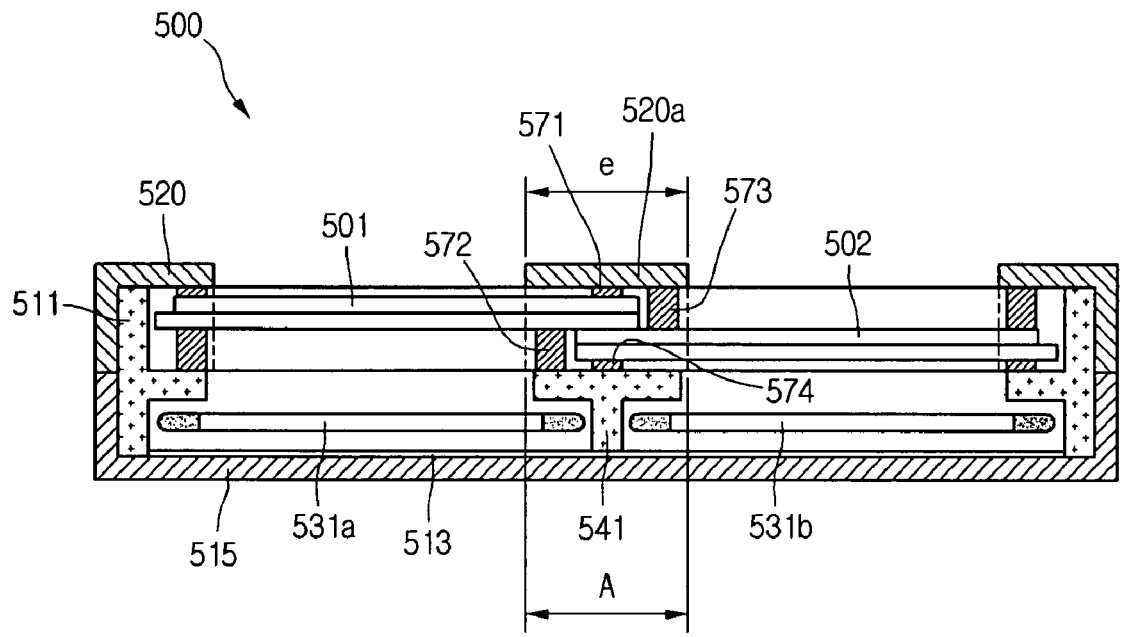
FIG. 13 is a cross-sectional view of the display device illustrated in FIG. 12.

FIG. 12 is an exploded perspective view of a display device according to a fifth embodiment, and FIG. 13 is a cross-sectional view of the display device illustrated in FIG. 12. Although the tiling display device 500 of FIGS. 12 and 13 includes two display panels arranged in parallel, the number of the display panels can be more than two as discussed above. In addition, the liquid crystal panels may be arranged in various arrangements, such as in matrix form.

Referring to FIGS. 12 and 13, the display device 500 includes a first liquid crystal panel 501, a second liquid crystal panel 502, and a single backlight unit 510. The backlight unit 510 includes a first light emitting region 521 and a second light emitting region 522. The backlight unit 510 includes a plurality of lamps 531a and 531b emitting light, and a reflection plate 513 disposed under the lamps 531a and 531b to reflect light traveling toward the bottom case 515.

The first liquid crystal panel 501 and the second liquid crystal panel 502 are arranged adjacent one another in parallel, and the single backlight unit 510 is arranged under the first liquid crystal panel 501 and the second liquid crystal panel 502. The single backlight unit 510 provides light for both the first liquid crystal panel 501 and the second liquid crystal panel 502. A non-active area of the first liquid crystal panel 501 overlaps a non-active area of the second liquid crystal panel 502.

The display device 500 includes various support members for fixing and supporting the first liquid crystal panel 501 and the second liquid crystal panel 502. The support members include a first support member 571 disposed between the first liquid crystal panel 501 and a top case 520, a second support member 572 disposed between the first liquid crystal panel 501 and a guide panel 511, a third support member 573 disposed between the second liquid crystal panel 502 and the top case 520, and a fourth support member 574 disposed between the second liquid crystal panel 502 and the guide panel 511. The support members 571, 572, 573 and 574 may be coupled with the top case 520 or the guide panel 511. Alternatively, the support members 571, 572, 573 and 574 may form part of the partition wall 541.

Since the first liquid crystal panel 501 and the second liquid crystal panel 502 overlap one other, a width "e" of a shielding member 520a covering a non-active area NA in a screen of the display device 500 is reduced by approximately 50% due to the overlapped portion. Since a physical distance between the first liquid crystal panel 501 and the second liquid crystal panel 502 is reduced, they can be arranged close to each other.

The shielding member 520a of the top case 520 covers the non-active regions A of the first and second liquid crystal panels 501 and 502. As the non-active area of the first liquid crystal panel 501 overlaps the non-active area of the second liquid crystal panel 502, the width "e" of the shielding member 520a is further reduced. In the tiling display device driving at least two display panels attached to each other, the reduction in the width "e" of the non-active area NA leads to the reduction in the non-image display.

Although the lamps of the backlight unit 510 are arranged in a direct type in the drawings, various embodiments can also be applied to an edge type backlight unit and an LCD having the same. Specifically, the edge type backlight unit includes a guide panel receiving at least two display panels, at least one lamp arranged at an edge of the guide panel, and a light guide plate guiding the light emitted from the lamp in a front direction. In addition, the guide panel may further include partition walls between receiving spaces of the display panels, and through portions connecting the lamps disposed in the edges of the receiving spaces.

Figure 14:
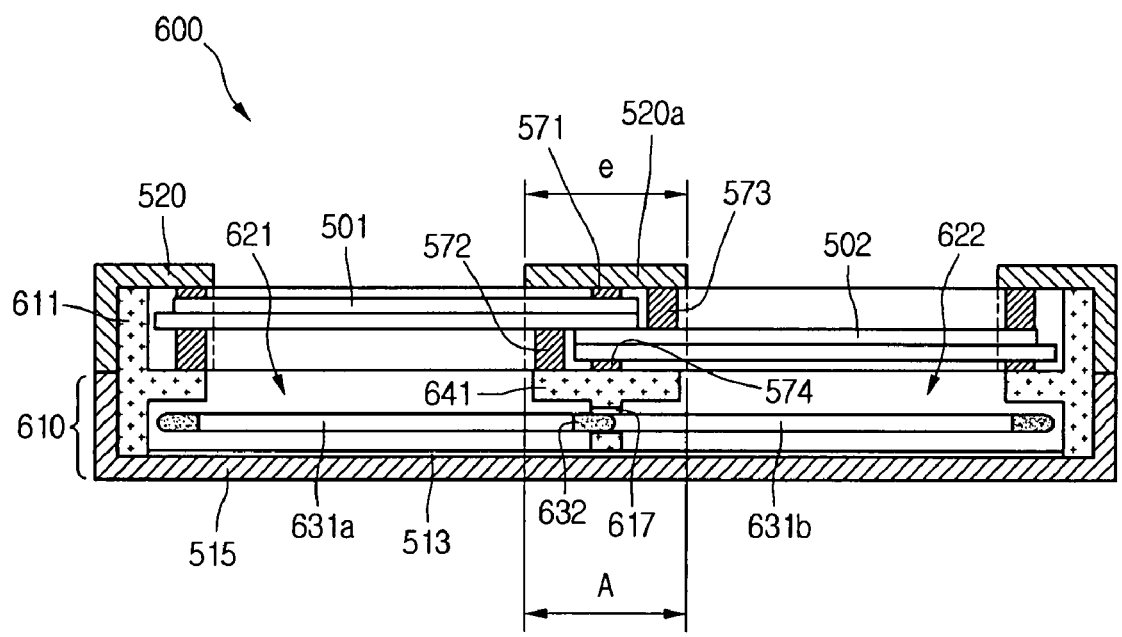
FIG. 14 is a cross-sectional view of a display device according to a sixth embodiment.

FIG. 14 is a cross-sectional view of a display device according to a sixth embodiment. A detailed description about parts similar to those of FIG. 13 will be omitted for conciseness. A partition wall 641 includes through portions 617 connecting the first and second lamps 631a and 631b. The partition wall 641 may include a plurality of through portions 617. Corresponding first and second lamps 631a and 631b may be overlapped in one through portion 617 as in FIG. 9.

Electrodes and circuit boards for supplying power to the lamps 631a and 631b are arranged in the through portions 617. The through portions 617 may be opened downward so as to receive the power. The through portions 617 provide spaces where the first and second lamps 631a and 631b overlap each other, thereby expanding an active area. Both ends of the first and second lamps 631a and 631b are the electrodes 632 that are non-light emitting regions. The through portion 617 may be shaped as described with respect to FIGS. 11a-11d discussed above.

The non-light emitting region can be reduced by overlapping the electrodes 632 of the first and second lamps 631a and 631b. In addition, since the electrodes 632 of the first and second lamps 631a and 631b contact each other, a voltage has only to be applied to the contact point of the electrodes 632.

The partition wall 641 is shared by the first light emitting region 621 providing light to the first liquid crystal panel 501 and the second light emitting region 622 providing light to the second liquid crystal panel 502. The partition wall 641 acts as a connection between the first liquid crystal panel 501 and the second liquid crystal panel 502 reducing the distance between them. Since a physical distance between the first liquid crystal panel 501 and the second liquid crystal panel 502 is reduced, the two liquid crystal panels 501 and 502 can be arranged closer to each other to reduce the non-visible area.

Due to the close arrangement of the first and second liquid crystal panels 501 and 502, the non-light emitting region of the backlight unit 610 may be exposed. However, the non-light emitting region of the backlight unit 610 is reduced. Therefore, even though a width "e" of the shielding member 520a of the top case 520 is reduced, the non-light emitting region will not be exposed. The tiling display device driving at least two display panels attached to each other can improve the image quality because of the reduction of the non-active area NAnd the width of the non-light emitting region.

Figure 15:
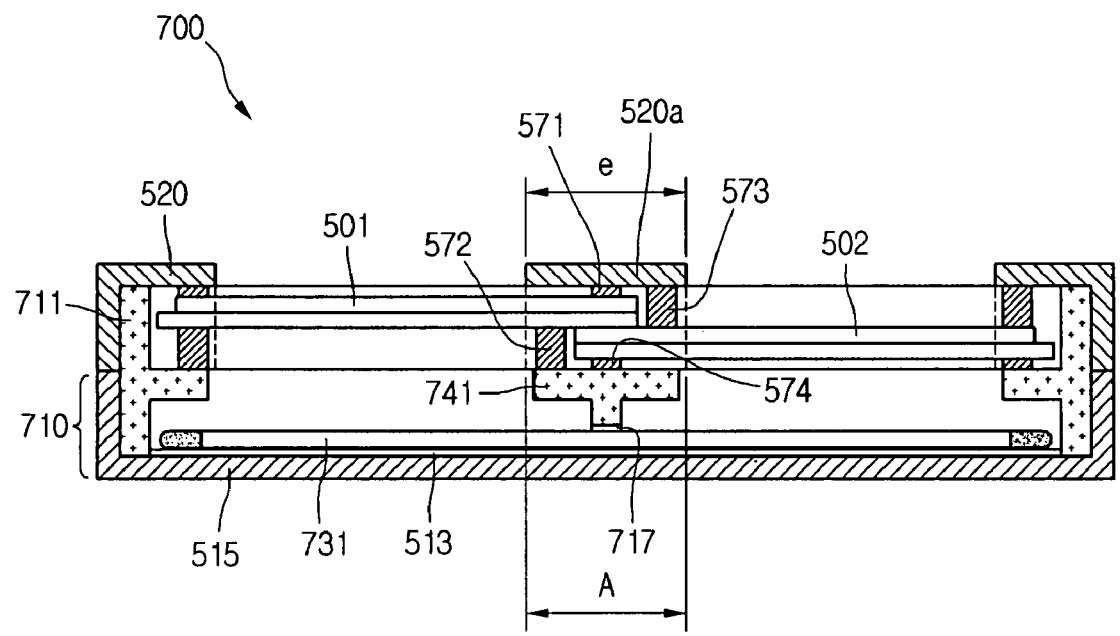
FIG. 15 is a cross-sectional view of a display device according to a seventh embodiment.

FIG. 15 is a cross-sectional view of a display device according to a seventh embodiment. A detailed description about parts similar to those of prior Figures will be omitted for conciseness. Lamps 731 of the display device 700 are arranged to cross at least two liquid crystal panels 501 and 502, similar to FIG. 7.

A guide panel 711 includes a partition wall 741 along the attached boundary of the liquid crystal panels 501 and 502. The partition wall 741 has a through portion 717 such that the lamp 731 may be crossed under the first and second liquid crystal panels 501 and 502. The partition wall 741 may include a plurality of through portions 717. The through portion 717 may be a hole shape or an opening shape in such a way that it is opened toward the bottom of the bottom case 515. The through portion 717 may be shaped as described with respect to FIGS. 11a-11d discussed above.

Since it is unnecessary to separately provide the lamps to the first and second liquid crystal panels 501 and 502, the number of the lamps of the backlight unit 710 can be reduced. Furthermore, since the number of inverters for supplying power is also reduced, a manufacturing cost of the display device can be reduced. In addition, since electrodes which are non-light emitting regions are formed only on the ends of the lamp 731, the lamp emits light even at the boundary between the first and second display panels 501 and 502. Since a width "e" of the non-active area NA is reduced, a non-image display region is reduced, thereby improving an entire image quality.

Figure 16A:
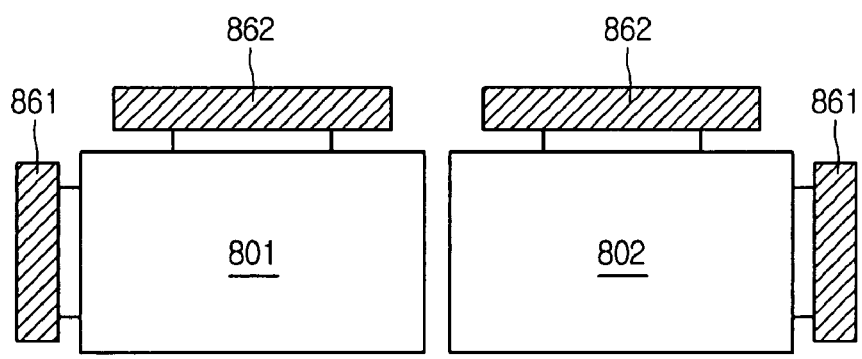
FIGS. 16A and 16B are plan views illustrating arrangement of display panels in a display device according to an embodiment.
Figure 16B:
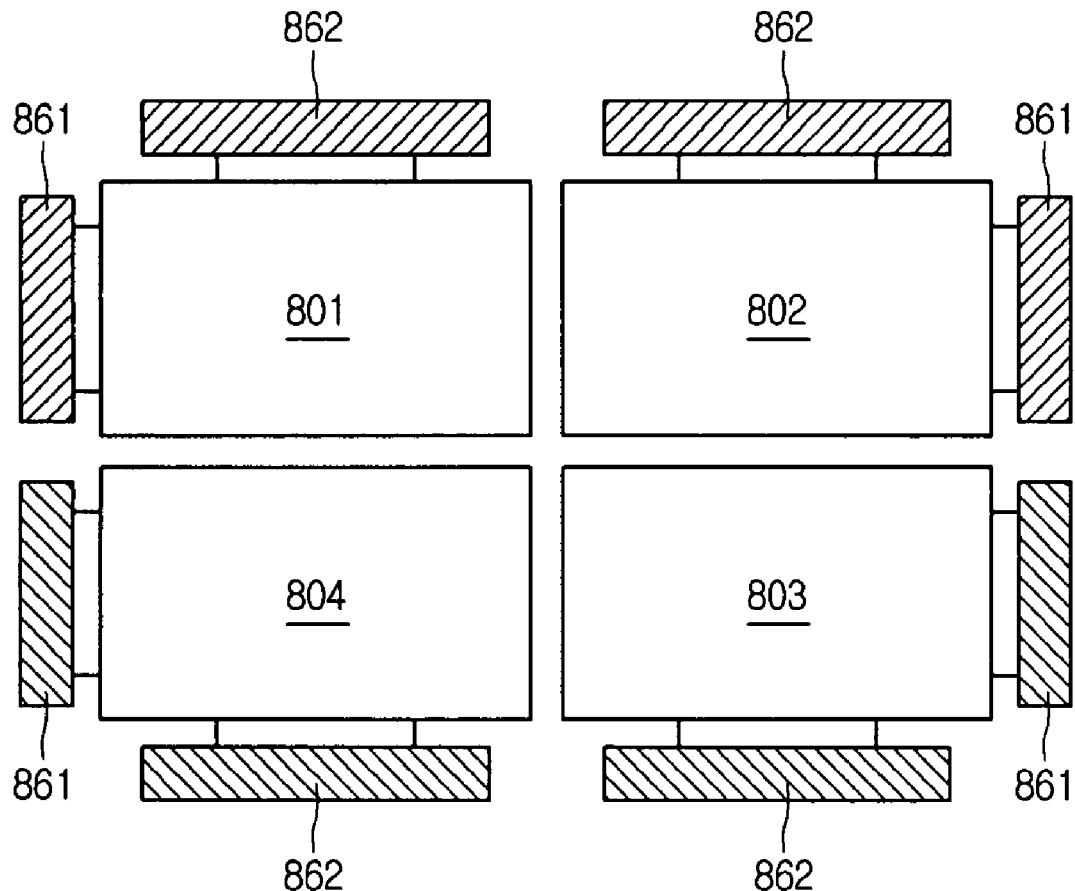

FIGS. 16a and 16b are plan views illustrating arrangement of display panels in a display device according to embodiments of the present disclosure. Referring to FIG. 16a, a first display panel 801 and a second display panel 802 are arranged in parallel or adjacent one another.

A gate driver 861 and a data driver 862 for driving the first display panel 801 and a gate driver 861 and a data driver 862 for driving the second display panel 802 are disposed in a region that is not at the boundary of the first and second display panels 801 and 802. Accordingly, it may be unnecessary to provide a space for the arrangement of the drivers in the display region of the display device. Consequently, an entire non-active area can be reduced, thereby improving an image quality.

Referring to FIG. 16b, first to fourth display panels are arranged in a 2×2 matrix. The gate drivers 861 and the data drivers 862 for driving the first to fourth display panels 801, 802, 803 and 804 are disposed in a region that is not a boundary of the first to fourth display panels 801, 802, 803 and 804. Accordingly, it may be unnecessary to provide a space for the arrangement of the drivers in the display region of the display device. Consequently, an entire non-active area can be reduced, thereby improving an image quality.

Figure 17A:
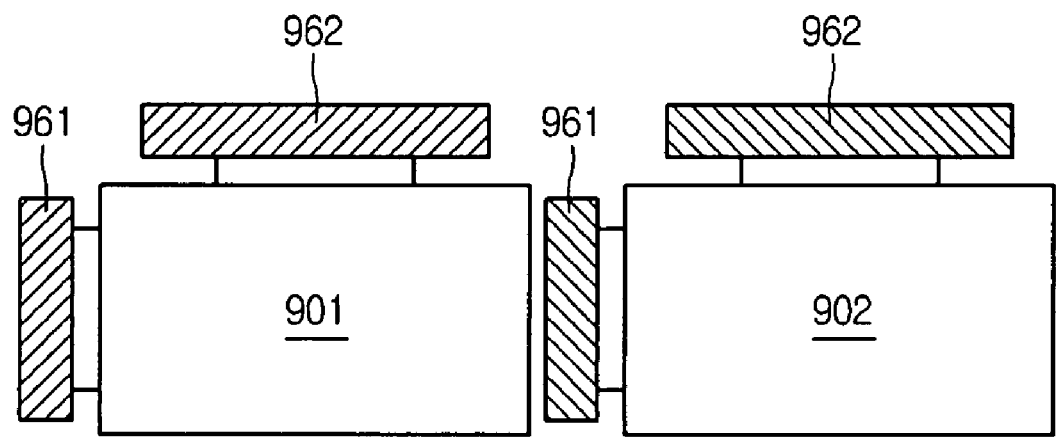
FIGS. 17A and 17B are plan views illustrating arrangement of display panels in a display device according to an embodiment.
Figure 17B:
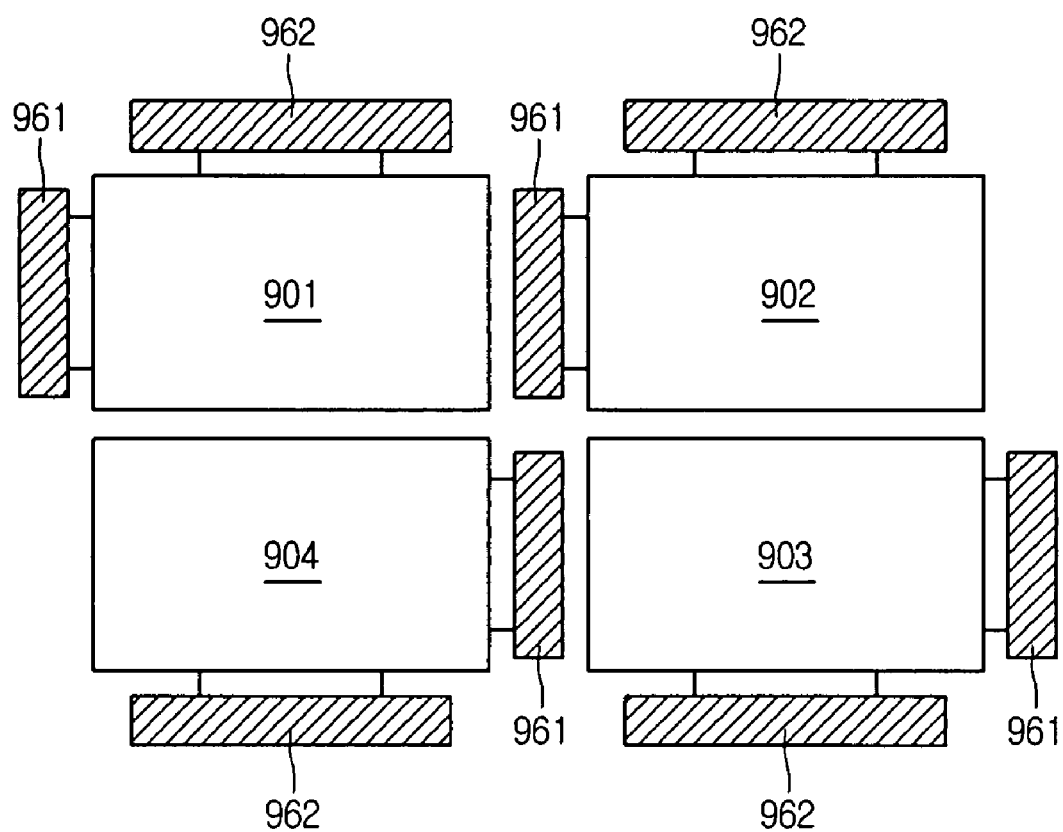

FIGS. 17a and 17b are plan views illustrating an arrangement of display panels in a display device according to embodiments of the present disclosure. Referring to FIG. 17a, a first display panel 901 and a second display panel 902 are arranged in parallel. The arrangement of a driver 960 and a data driver 962 for driving the first display panel 901 is similar to that of a gate driver 961 and a data driver 962 for driving the second display panel 902. The first display panel 901 and the second display panel 902 may be similar or identical to one other.

Referring to FIG. 17b, first to fourth display panels 901, 902, 903 and 904 are arranged in a 2×2 matrix. The gate drivers 961 and the data drivers 962 for driving the first to fourth display panels 901, 902, 903 and 904 are arranged in an alternate arrangement. As shown, each of the panels 901, 902, 903 and 904 includes the same relative location of both gate drivers 961 and the data drivers 962. Accordingly, having the display panels arranged in the same way encourages mass production of the panels.

In addition, even though the size of the display device is larger, the image quality can be improved using existing products, without development of new optical components and light sources. Consequently, additional cost for new technology developments is not required and a manufacturing cost of the display device can be reduced.

Although the present disclosure describes embodiments applied to an array substrate of a top gate type LCD device and method for fabricating the same, the present invention is not limited to the embodiments set forth herein; rather, it will be apparent to those skilled in the art that various modifications and variations can be made in the present invention.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. The above disclosed subject matter is to be considered illustrative, and not restrictive, and the appended claims are intended to cover all such modifications, enhancements, and other embodiments, which fall within the true spirit and scope of the present invention.

What is claimed is:

1. A display device comprising:
   at least two display panels;
   one guide panel configured to receive the display panels, the guide panel comprising a frame disposed along a periphery of the display panels and a partition wall within the frame and configured to receive at least an end portion of the display panels; and
   a backlight unit configured to provide light to the display panels,
   wherein the partition wall comprises at least one through portion, and
   wherein the backlight unit comprises at least one lamp configured to cross the at least one through portion.

2. The display device of claim 1 wherein the backlight unit comprises a plurality of lamps including a first lamp and a second lamp, further wherein the first lamp overlaps the second lamp at the through portion.

3. The display device of claim 2 wherein the display panels comprise a first display panel and a second display panel, wherein an end portion of the first display panel overlaps with an end portion of the second display panel at the partition wall.

4. The display device of claim 1 wherein the display panels comprise a first display panel and a second display panel, wherein an end portion of the first display panel overlaps with an end portion of the second display panel at the partition wall.

5. The display device of claim 1 further comprising:
a bottom case configured to house the guide panels and the backlight unit; and
a top case coupled with the bottom case and providing display areas corresponding with the display panels.

6. The display device of claim 1 wherein each of the display panels is coupled with a gate driver and a data driver, further wherein the gate driver and the data driver for the display panels are disposed adjacent the frame along an outer portion of the display panels.

7. The display device of claim 1 wherein the partition wall further comprises a mounting portion, further wherein the mounting portion is configured to stabilize one of the display panels received at the guide panel.

* * * * *